July 9, 1968    F. E. BUSCHBOM    3,391,807
METHOD AND APPARATUS FOR TENSIONING A BELT
Filed Oct. 22, 1965    2 Sheets-Sheet 1

INVENTOR.
FLOYD E. BUSCHBOM
BY
Bradback & Burd
ATTORNEYS

July 9, 1968  F. E. BUSCHBOM  3,391,807
METHOD AND APPARATUS FOR TENSIONING A BELT
Filed Oct. 22, 1965  2 Sheets-Sheet 2
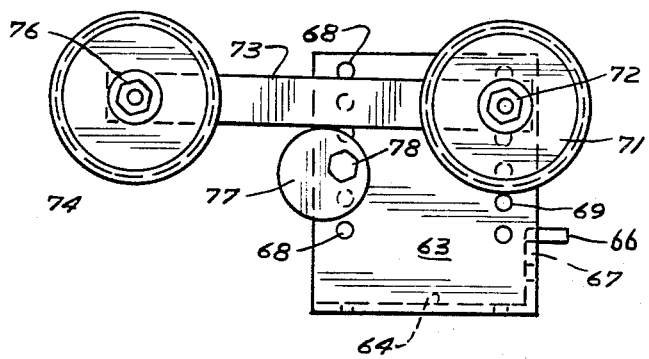
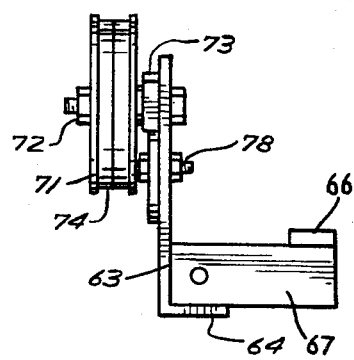
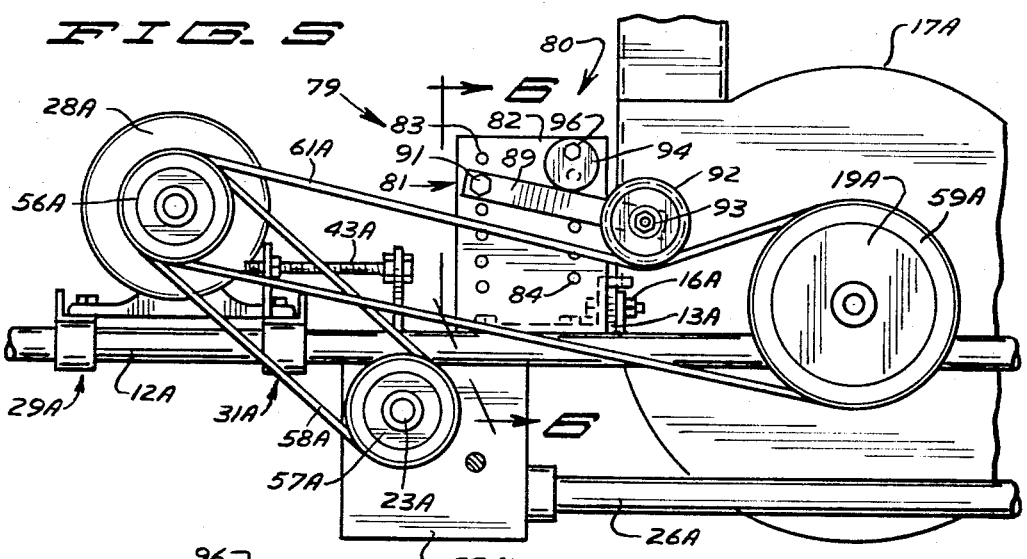
INVENTOR.
FLOYD E. BUSCHBOM
BY
Braddock & Burd
ATTORNEYS United States Patent Office 3,391,807
Patented July 9, 1968

3,391,807
METHOD AND APPARATUS FOR
TENSIONING A BELT
Floyd E. Buschbom, Long Lake, Minn., assignor to Van
Dale Corporation, Wayzata, Minn., a corporation of
Minnesota
Filed Oct. 22, 1965, Ser. No. 501,158
13 Claims. (Cl. 214—17)

ABSTRACT OF THE DISCLOSURE

A belt tightener mounted on the frame of a silo unloader to place tension on the slack run of a belt coupling an electric motor and a blower pulley. The belt tightener, mounted on the frame between the blower and the electric motor, has an upright support plate having two rows of upright holes. A bolt cooperating with one of the holes pivotally mounts an arm on the plate. A first axle rotatably mounts a first pulley on the outer end of the arm to engage the slack run of the belt to provide a coarse adjustment of the belt tension. A second axle rotatably mounts the second pulley on the opposite end of the arm. The bolt and the second axle are a common member. The second pulley engages the opposite side of the slack run of the belt. An eccentric cam rotatably mounted on the plate in one of the second holes engages the midportion of the arm to pivot the arm and hold the arm in an adjusted position whereby the first and second pulleys place a broad S curve in the belt to provide a fine adjustment of belt tension. In applications where the belt has a short slack run, only one pulley is rotatably mounted on the outer end of the arm. The eccentric cam engages a midportion of the arm forcing the pulley downwardly on the run of the belt.

---

The invention relates to a method and apparatus for tightening the flexible elements of a drive system for a silo unloader. The apparatus is a belt tightener having a first adjustment to apply a coarse tension on a belt trained about a drive pulley and a driven pulley and a second fine adjustment to place additional tension on the belt to compensate for stretch and belts of varying lengths. The belt tensioner is mounted on the frame of a silo unloader where it is readily accessible for adjustment to vary the tension on the belt coupling the silo unloader motor with the impeller pulley. The belt tightener has a support provided with a plurality of first holes and a plurality of second holes spaced from the first holes. Located adjacent the support and pivotally mounted on the support by a bolt cooperating with one of the first holes is an arm rotatably carrying a pulley. The pulley aligned with the slack run of the belt is forced into engagement with the run of the belt with an adjustable means mounted on the support. A second means cooperating with one of the second holes movably mounts the adjustable means on the support. Both the arm and the adjustable means are selectively positioned on the support so that both the coarse and fine tension on the belt is readily changed.

In the drawings:

FIGURE 3 is an enlarged side view of the belt tightener of FIGURE 1;

FIGURE 4 is an end elevational view of FIGURE 3;

FIGURE 5 is a view similar to FIGURE 1 showing a modified belt tightener; and

FIGURE 6 is an enlarged sectional view taken along the line 6—6 of FIGURE 5.

Figure 1:
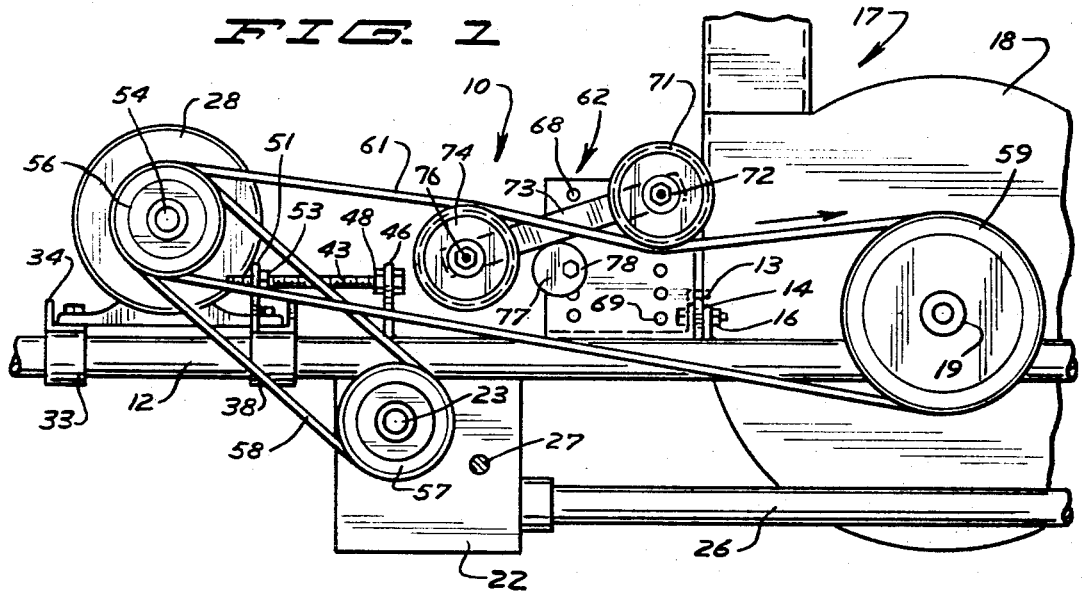
FIGURE 1 is a side elevation view of a silo unloader drive assembly having a belt tightener constructed according to the invention.
Figure 2:
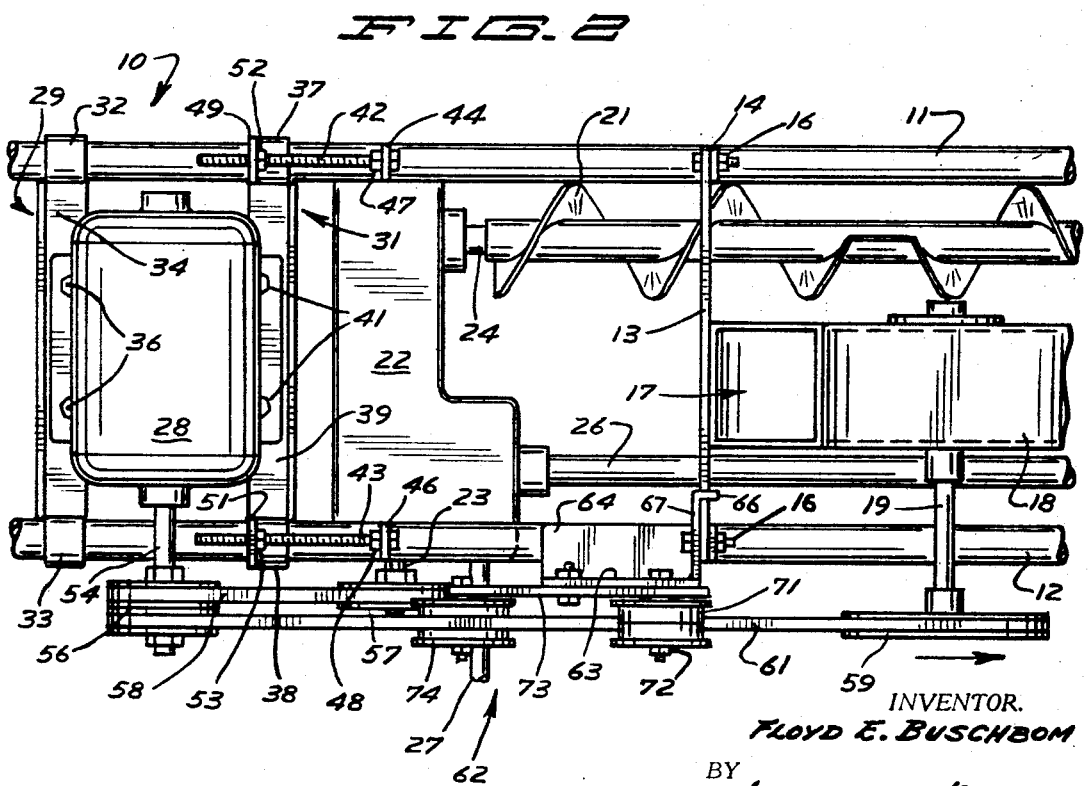
FIGURE 2 is a plan view of the structure shown in FIGURE 1.

Referring to the drawings there is shown in FIGURES 1 and 2, a fragment of a silo unloader indicated generally at 10 equipped with the belt tightener of this invention. The silo unloader has a pair of elongated longitudinal frame members 11 and 12 interconnected by transverse bars 13, one of which is shown. The opposite ends of the bar 13 are located adjacent upwardly projected ears 14 secured to the frame members 11 and 12. Nut and bolt assemblies 16 secure opposite ends of the bar 13 to the ears 14.

An upright impeller indicated generally at 17 positioned along a longitudinal plane between the frame members 11 and 12 is secured to the transverse bars 13. Impeller 17 has a scroll housing 18 formed with a bottom inlet for receiving ensilage and a top outlet for discharging ensilage. A transverse shaft projected through the housing 18 is rotatably mounted on the housing sidewalls. Rotor structure (not shown), including pivotally mounted hammers, is mounted on the shaft 19 within the housing 18 and functions to move ensilage from the housing inlet upwardly and out through the housing outlet as described and shown in U.S. Patent No. 2,958,412. Ensilage is collected and moved toward the impeller housing 18 by a pair of collector augers 21 extended longitudinally along opposite sides of the impeller. The augers 21 are drivably connected to a speed reducer gear box or transmission 22 extended transversely below and secured to frame members 11 and 12. The transmission 22 has a laterally projected input shaft 23, longitudinal drive shafts 24 and 26 connected to the augers 21, and an output shaft 27 used to transmit force to a rotatable unit (not shown) used to move the silo unloader around the silo as described and shown in U.S. Patent No. 3,139,995.

Power to rotate the impeller shaft 19 and the input shaft 23 of transmission 22 is derived from an electric motor 28 transversely positioned between the longitudinal frame members 11 and 12 adjacent the rear of impeller 17. The motor 28 is attached to a rear motor mount 29 and a front motor mount 31. As shown in FIGURE 2, mounts 29 and 31 extend transversely of the frame members 11 and 12 and are slidably supported on frame members 11 and 12 for longitudinal movement along the frame members. Motor mount 29 comprises sleeves 32 and 33 positioned about the frame members 11 and 12, respectively. Opposite ends of a transverse angle member 34 are secured to the sleeves 32 and 33. Angle member 34 has a vertical flange and a forwardly directed horizontal flange carrying the base of the motor 28. Bolt and nut assemblies 36 are used to secure the motor to the horizontal flange. Motor mount 31 is similar to the motor mount 29. Mount 31 has sleeves 37 and 38 slidably positioned about frame members 11 and 12, respectively and a transverse angle member 39 secured at opposite ends to the sleeves 37 and 38. Angle member 39 has a rearwardly directed horizontal flange carrying the opposite motor support. Bolt and nut assemblies 41 secure motor 28 to the angle member 39.

Adjustment of the motor mounts 29 and 31 longitudinally of the frame members 11 and 12 is achieved by a pair of longitudinal bolts 42 and 43 projected through upright lugs 44 and 46 secured to the frame members 11 and 12, respectively. Nuts 47 and 48 threaded onto the bolts 42 and 43 fix the bolts to the lugs 44 and 46. From the lugs 44 and 46 the bolts 42 and 43 project rearwardly through suitable holes in upright ears 49 and 51 secured to the sleeves 37 and 38. Nuts 52 and 53 threaded onto the bolts 42 and 43 engage the front sides of the ears 49 and 51 and are adjustable to change the longitudinal position of the motor mounts 29 and 31 on the frame members 11 and 12.

As shown in FIGURE 2, motor 28 has a laterally projected drive shaft 54 carrying a dual pulley 56. The inside sheave of the pulley 56 is in alignment with a pulley 57 mounted on the transmission input shaft 23. A belt 58, such as a V-belt, is trained about the inside sheave of pulley 56 and pulley 57 so as to transmit power from motor 28 to the transmission 22. The outside sheave of the drive pulley 56 is in alignment with a pulley 59 mounted on the impeller shaft 19. Belt 61 trained about pulleys 56 and 59 transmits power from the motor 28 to the impeller 17.

The tension on belt 58 is adjusted by changing the longitudinal position of the motor mounts 29 and 31 relative to the frame members 11 and 12. This is accomplished by rotating the nuts 52 and 53 relative to the bolts 42 and 43. The tension on the belt 61 is adjusted by a belt tightener indicated generally at 62.

As shown in FIGURE 1, belt tightener 62 is used to provide the upper or slack run of the belt 61 with a reverse bend or broad S curve to apply tension to the belt. Referring to FIGURES 2, 3 and 4 belt tightener 62 has a support comprising an upright plate 63 positioned adjacent and substantially parallel to the direction of movement of the belt 61. The plate 63 is integral with a horizontal base 64 extended over the top portion of the frame member 12. An inwardly projected upright tab 67 secured to the base and plate is attached by the nut and bolt assembly 16 to the transverse bar 13. Tab 67 has a forwardly projected ear 66 positioned over bar 13. Plate 63 has two upright rows of vertically spaced holes 68 and 69.

The top run of the belt 61 is forced in a downward direction by a first idler pulley 71 rotatably mounted on an axle assembly 72 including a nut and bolt projected through one of the holes 69 and secured to the plate 63. Positioned adjacent the outside face of the plate 63 and pivotally mounted at one end to the axle assembly 72 is a forwardly projected arm 73. The arm 73 projects toward the motor 28 terminating in a forward end carrying a second idler pulley 74 mounted on an axle assembly 76 including a bolt and nut used to secure the pulley 74 to the arm 73. Pulley 74 runs on the inside of the upper run of the belt 61 forcing the mid-portion of the belt in an upward direction. The vertical position of pulley 74 is adjusted with the use of an eccentric cam or eccentric disc 77 adjustably mounted on the support with a bolt and nut 78 projected through one of the holes 68 in the upright plate 63. The periphery of the cam engages the lower side of the arm 73. The head of bolt 78 is secured to the eccentric disc 77 so that on rotation of the bolt the disc is rotated to very the angular position of the arm 73 and thus change the tension on belt 61.

In the installation of the belts 58 and 61 about the motor drive pulley 56, the gear box pulley 57 and the impeller pulley 59, belt 58 is kept as close to the frame member 12 as possible. With the belts positioned about the pulleys the gear box pulley 57, impeller pulley 59 and motor pulley 56 are aligned with each other and secured to their respective shaft with fastening members, such as set screws (not shown). Motor 28 is then moved in a rearward direction along the frame members 11 and 12 by rotating the adjusting rod nuts 52 and 53 relative to the threaded bolts 42 and 43 until belt 58 has the correct tennion. The nuts 52 and 53 must be rotated an equal amount to keep the motor pulley 56 in alignment with the pulleys 57 and 59. The impeller belt 61 is tightened by placing the top run of the belt 61 under the pulley 71 and over the pulley 74 and turning the eccentric disc 77 until the belt has the correct tension on it. In the event that belt 61 cannot be tightened by angularly moving arm 73 with the ececntric 77, axle assembly 72 may be moved in a lower hole 69 or the bolt 78 secured to the eccentric disc 77 may be moved to an upper hole 68 to decrease the amount of slack in the belt. When the correct tension on the belt 61 has been acquired the nut on the bolt 78 is tightened to fix the position of the eccentric cam 77 and thereby hold the arm 73 in a fixed position.

Referring to FIGURE 5, there is shown a fragment of a silo unloader 79 similar to the silo unloader 10 equipped with a belt tightener indicated generally at 80. Identical elements of silo unloader 79 and 10 are identified with the same reference numerals having the suffix A. In silo unloader 79 motor 28A is located close to impeller 17A. Belt 61A is trained over drive pulley 56A and driven pulley 59A. Tightener 80 has a support 81 comprising an upright plate 82 having two upright rows of vertically spaced holes 83 and 84. A horizontal base 86 is attached to the lower edge of the upright plate 82 and projects over the frame member 12A. Secured to the forward edge of the base 86 and the upright plate 82 is an upright tab 88 attached to the transverse bar 13A by nut and bolt assembly 16A. Tab 88 has a forwardly projected ear 87.

Positioned adjacent the outside of the upright plate 82 is a forwardly extended arm 89 pivotally mounted to the plate by a bolt 91. The bolt 91 projects through one of the holes 83 and is threaded onto a nut 90 to pivotally mount the arm 89 on the plate 82. The forward end of the arm 89 projected toward the pulley 59A rotatably carries an idler pulley 92. An axle assembly 93 including a bolt and nut is used to mount the pulley 92 on the arm 89. Pulley 92 rides on the top run of the belt 61A forcing the belt around the impeller pulley 59A. Angular position of the arm 89 is adjusted by an eccentric cam or disc 94 engageable with the center portion of the top side of the arm 89. A bolt 96 secured to the cam 94 projects through one of the holes 84 in plate 82 to rotatably mount the cam on the plate. A nut 97 threaded onto the end of bolt 96 holds the cam 94 in an adjusted position which determines the position of the arm 89 and the force of pulley 92 on belt 61A.

Tension on impeller belt 61A is adjusted and maintained by the belt tightener 80. Pulley 92 rides on the top of the upper run of belt 61A and forces the belt in a downward direction to increase the contact arc of the belt on the impeller pulley 59A and keep the belt under tension. Pulley 92 is carried on arm 89. Bolt 91 pivotally mounts the arm 89 on support 81 for movement in an upright plane to change the elevation of pulley 92. Adjustable eccentric cam 94 engages the arm 89 and is used to change and to maintain the angular position of the arm to adjust the tension on belt 61A. The pivot end of the arm 89 can be pivotally mounted on the support 81 in a number of vertical positions by inserting the bolt 91 through one of the holes 83 in the upright plate 82. In a like manner the eccentric cam 94 may be secured to the upright plate 82 in a number of positions by inserting the bolt 96 through one of the vertically spaced holes 84. This structure enables tightener 80 to be used with belts of varying lengths and to accommodate for belt stretch.

The specific embodiments described are given by way of example only and the invention is limited only by the terms of the appended claims.

What is claimed is:

1. A belt tightener for a belt trained about a drive pulley and a driven pulley comprising a support having a plurality of first holes and a plurality of second holes spaced from the first holes, a pulley engaging one side of said belt, an arm, first means cooperating with one of the first holes pivotally mounting the arm on said support, said first holes selectively accommodating said first means to change the pivot axis of the arm relative to said belt, second means mounting the pulley to said arm for rotation about an axis substantially normal to the movement of said belt, adjustable means engageable with said arm for holding the pulley in engagement with the belt and second means cooperating with one of the second holes for movably mounting the adjustable means on the support, said second holes selectively accommodating said second means whereby a changing of the location of the second means on the support provides the arm with a coarse adjustment.

2. The belt tightener of claim 1 wherein said adjustable means includes an eccentric cam engageable with said arm and rotatable to change the angular position of the arm to adjust the tension on the belt.

3. The belt tightener of claim 1 wherein said support has a plurality of holes for selectively accommodating said first means to change the pivot axis of the arm.

4. The belt tightener of claim 1 wherein said second means includes a bolt positioned in one of the second holes in said support.

5. A belt tightener for a belt trained about a drive pulley and a driven pulley comprising an upright support positioned adjacent the run of the belt moving toward the driven pulley, said support having a plurality of holes, a first pulley engaging the outer side of said run of the belt, a second pulley engaging the inner side of said run of the belt, axle means cooperating with one of said holes mounting the first pulley on the support for rotation about a first axis substantially normal to the movement of said run whereby the first pulley can be moved toward and away from the belt, arm means pivotally connected to said support for movement about an axis substantially parallel to said first axis, said arm means located between said first pulley and said support, means rotatably mounting said second pulley on said arm means for rotation about an axis spaced from and substantially parallel to said first axis, and eccentric means adjustably secured to said support and engageable with said arm means for holding said second pulley in engagement with said slack run of the belt.

6. The belt tightener defined in claim 5 wherein said upright support has a plurality of first holes for selectively accommodating said axle means whereby the first pulley can be moved toward and away from the belt and a plurality of second holes for selectively mounting the eccentric means on the support.

7. The belt tightener defined in claim 5 wherein said upright support has a plurality of second holes for selectively accommodating a bolt secured to the eccentric means.

8. The belt tightener defined in claim 5 wherein said arm means is pivotally mounted on said axle means.

9. A belt tightener for a belt trained about a drive pulley and a driven pulley comprising a support positioned adjacent the slack run of the belt said support having a plurality of holes, a first pulley engaging the one side of said slack run of the belt, a second pulley engaging the opposite side of said slack run of the belt, axle means cooperating with one of said holes mounting the first pulley on the support for rotation about an axis substantially normal to the movement of said slack run whereby the first pulley can be moved toward and away from the slack run of the belt, arm means pivotally connected to said support, means rotatably mounting said second pulley to said arm means, and means adjustably secured to said support and engageable with said arm means for holding said second pulley in engagement with said slack run of the belt.

10. In a silo unloader having a frame including a pair of elongated spaced parallel frame members, an impeller secured to said frame members intermediate of the ends of said elongated members, an impeller shaft extended from said impeller, a pulley secured to said impeller shaft, gear box secured to said frame intermediate to the ends of said members and spaced longitudinally from said impeller, said gear box having a power input shaft, the pulley secured to said power input shaft, front and rear motor mounts slidably mounted on said parallel elongated members, a motor having a drive shaft positioned between and secured to said motor mounts, a dual mounted on the drive shaft of said motor, first and second belts reeved around said dual pulley and the pulleys of said impeller shaft and said gear box input shaft, an adjustable means engageable with at least one of said motor mounts operable to move the motor relative to the parallel frame members to apply tension to the second belt reeved around the pulley on the gear box input shaft partially placed under tension the first belt reeved around the pulley on the impeller shaft, a support secured to the parallel member adjacent said belts and projected upwardly adjacent the top run of the belt trained about the impeller pulley, said support having a plurality of first holes and a plurality of second holes, an arm, first means cooperating with one of said first holes to pivotally mount the arm on said support, an idler pulley rotatably mounted on said arm and engageable with a portion fo said first belt, adjustable means engageable with the arm for holding the idler pulley in engagement with the first belt thereby placing the first belt under tension, and second means cooperating with one of the second holes mounting the adjustable means on the support.

11. In a silo unloader having an elongated frame, an impeller having an impeller shaft secured to said elongated frame, a pulley secured to said impeller shaft, transmission means having a power input shaft secured to said frame and spaced from said impeller, motor mount means slidably mounted on said elongated frame, a motor having a drive shaft secured to said motor mount means, pulley means mounted on the drive shaft of said motor, a first belt and a second belt reeved around said pulley means and the pulleys on said impeller shaft and said power input shaft respectively, an adjustable means engageable with said motor mount means operable to move the motor relative to the elongated frame to apply tension to the second belt reeved around the pulley on the power input shaft and partially place under tension the first belt reeved around the pulley on the impeller shaft, and a belt tightener means secured to said frame for placing the first belt under tension, said belt tightener including a support positioned adjacent the slack run of the first belt, said support having a plurality of first holes and a plurality of second holes, first idler pulley engaging the outside of said slack run, a second idler pulley engaging the inner side of said slack run, axle means cooperating with one of said first holes mounting the first idler pulley on the support for rotation about a first axis substantially normal to the movement of said slack run, arm means pivotally connected to said support for movement about an axis substantially parallel to said first axis, means rotatably mounting said second idler pulley on said arm for rotation about an axis spaced from and substantially parallel to said first axis, eccentric means engageable with said arm means for holding said second idler pulley in engagement with said slack run thereby placing said slack run in a broad S configuration and means cooperating with one of the second holes for mounting the eccentric means on the support.

12. A method of tightening a first belt and a second belt each reeved around a dual driving pulley and either of two single driven pulleys comprising the steps of: moving said dual pulley in a direction away from said two single driven pulleys placing the first belt under tension and taking up a portion of the slack in the second belt, and placing a course tension adjustment on the second belt by applying a first force to a portion of the slack run of the second belt between the driving pulley and the driven pulley in a direction generally normal to the movement of the belt and then placing a fine tension adjustment on the second belt by applying an opposite force on the slack run of the second belt keeping said slack run of the belt in a broad S curve.

13. The method of tightening a belt reeved around a driven pulley and a driving pulley comprising the steps of: placing a course tension adjustment on the belt by applying an inwardly directed force to a portion of the outside of the slack run of the belt, and then placing a fine tension adjustment on the belt by applying an opposite force to the inside of the slack run of the belt keeping the slack run in a broad S curve.

References Cited
UNITED STATES PATENTS

| | | | |
|---|---|---|---|
| 1,794,038 | 2/1931 | Siddall | 74—242.1 |
| 1,847,720 | 3/1932 | Marcellis | 74—242.1 |
| 2,791,910 | 5/1957 | Eckley | 74—242.1 |
| 3,103,125 | 9/1963 | Dutro et al. | 74—242.1 |
| 3,207,332 | 9/1965 | Buschbom | 214—17 |

ROBERT G. SHERIDAN, *Primary Examiner.*